United States Patent [19]

Boissevain

[11] Patent Number: 4,738,196

[45] Date of Patent: Apr. 19, 1988

[54] AIR HEATER FOR A CALENDER ROLL DIAMETER CONTROLLER

[75] Inventor: Mathew G. Boissevain, Cupertino, Calif.

[73] Assignee: Measurex Corporation, Cupertino, Calif.

[21] Appl. No.: 887,072

[22] Filed: Jul. 17, 1986

Related U.S. Application Data

[63] Continuation-in-part of Ser. No. 695,438, Feb. 28, 1985, which is a continuation-in-part of Ser. No. 694,855, Jan. 25, 1985.

[51] Int. Cl.$^4$ .................... B30B 15/34; B30B 15/04
[52] U.S. Cl. .................... 100/93 RP; 100/47; 100/162 B; 100/170; 29/113 AD; 219/10.71; 219/370
[58] Field of Search ............ 100/38, 47, 93 R, 917, 100/162 B, 170; 219/370, 10.41, 10.43, 10.57, 10.61 R, 10.71, 10.73; 29/116 AD, 113 AD

[56] References Cited

U.S. PATENT DOCUMENTS

| | | | |
|---|---|---|---|
| 2,609,477 | 9/1952 | Borda et al. | 219/370 X |
| 3,094,606 | 6/1963 | Ferris | 219/370 X |
| 3,668,370 | 6/1972 | Pattison | 219/370 X |
| 4,573,402 | 3/1986 | Sharma et al. | 100/93 RP |

FOREIGN PATENT DOCUMENTS 211003  10/1957  Australia ............ 100/93 RP

Primary Examiner—Peter Feldman
Attorney, Agent, or Firm—Spensley Horn Jubas & Lubitz

[57] ABSTRACT

An electrical air heater for a calender roll diameter control device is described. The heater comprises a tube for directing a flow of air along the inside of the tube from a plenum toward an object which is to be heated. An electrically resistive heating element is mounted inside the tube to heat the flow of air as it flows from the rear to the front of the tube. Since the air is heated by the heating element inside the tube, the air is coolest when it first enters the tube and hottest where it escapes at the front of the tube. Similarly, the heating element is cooled by the air and is, therefore, hottest near the front of the tube where the heated air escapes. The hotter front end of the heating element tends to burn out faster than the cooler end of the heating element. To prolong the life of the heater, openings are provided in the tube wall to admit a flow of cooling air at the hottest part of the heating element.

17 Claims, 3 Drawing Sheets

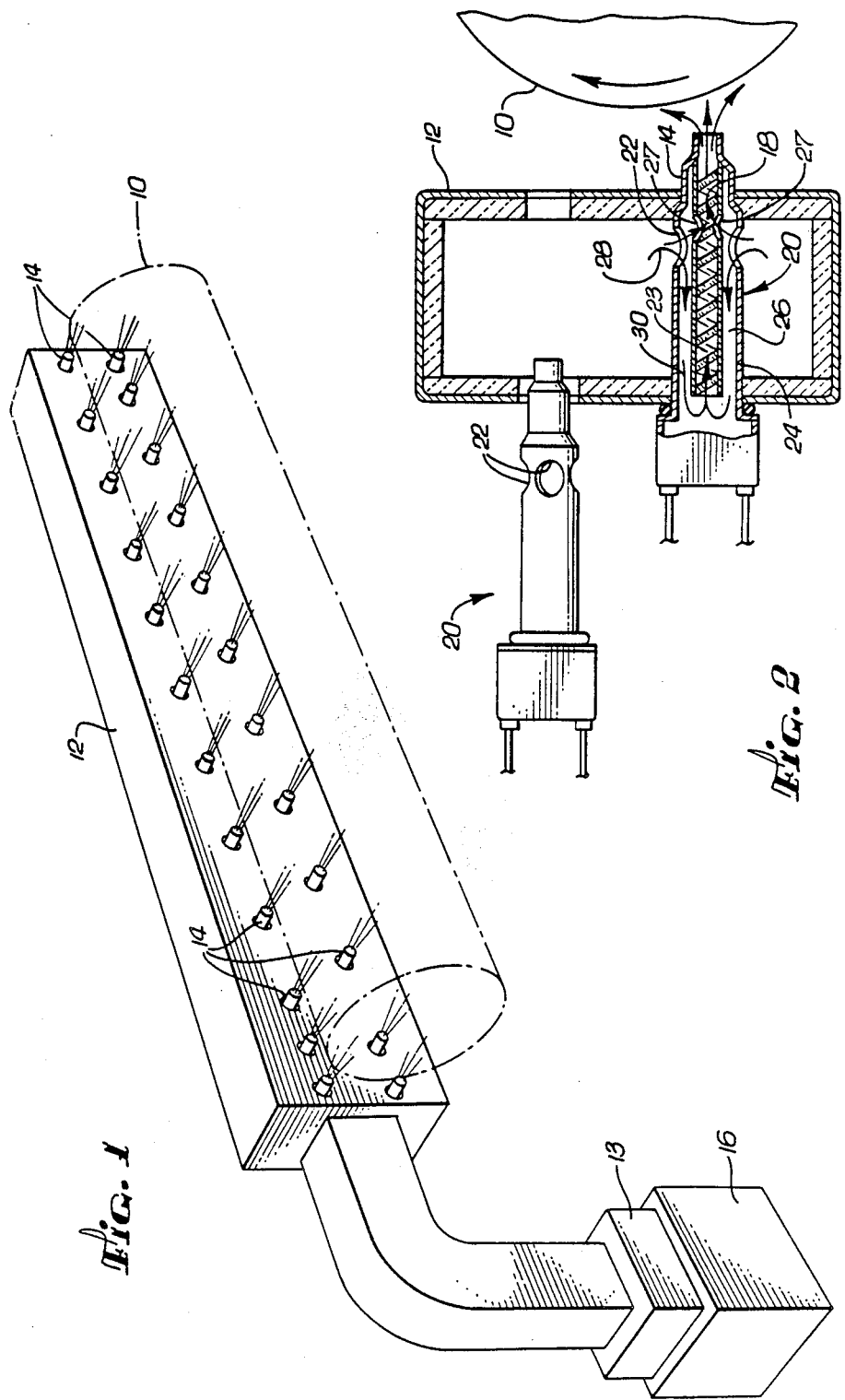

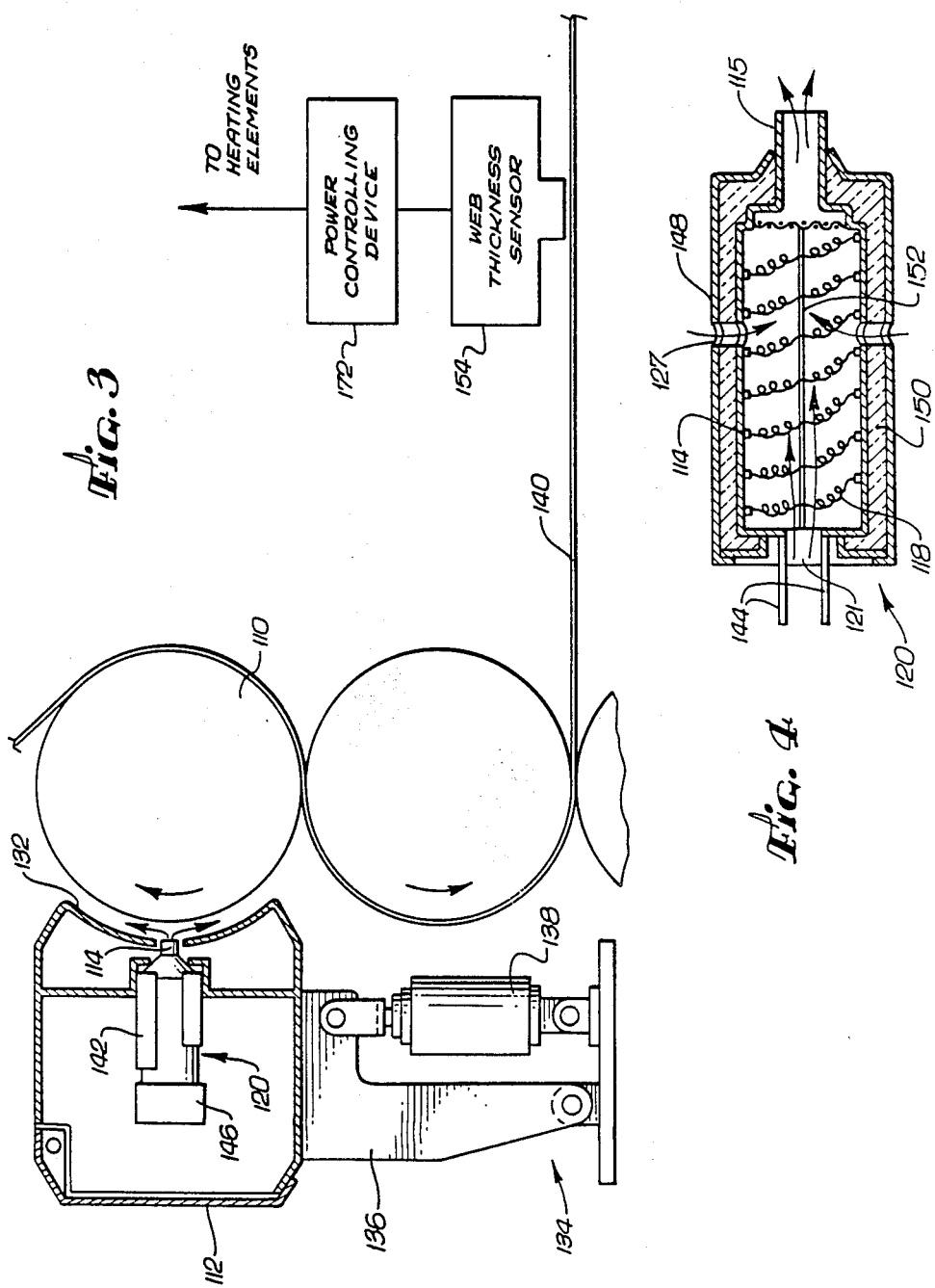

AIR HEATER FOR A CALENDER ROLL DIAMETER CONTROLLER

CROSS REFERENCE TO RELATED APPLICATIONS

This is a continuation-in-part application of the pending prior application of Mathew G. Boissevain, Ser. No. 695,438, filed Feb. 28, 1985, entitled "Hot Air Calender Roll Controller". Application Ser. No. 695,438 is a continuation-in-part application of the pending prior application of Mathew G. Boissevain, Ser. No. 694,855, filed Jan. 25, 1985, also entitled "Hot Air Calender Roll Controller".

BACKGROUND OF THE INVENTION

The present invention relates to the field of calendering machines, and more particularly to devices for controlling the diameter of the rolls used in calendering machines.

Pressing a material between two calender rolls can change the physical characteristics of the material. For example, calendering paper changes it density, thickness and surface features. Thus, the calendering process is frequently used in the manufacture of paper and other sheet materials to control the characteristics of the sheet.

A common problem associated with calendering is the uneven thickness of the calendered sheet material, or "web". Localized variations in a variety of parameters, including the moisture content of the web, creates variations in the spacing or "nip" formed between cooperating rolls. Variations in the nip across the width of a pair of calender rolls produces a web having a non-uniform thickness. However, if the calender rolls are made of a material that expands and contracts with changes in temperature, one may control the diameter of at least one of the rolls along its axis by varying the temperature of selected cylindrical sections of the roll. The thermal expansion and contraction of the roll allows the calender roll operator to obtain a more uniform web thickness.

A number of previously known devices have heated and cooled the roll sections with jets of hot and cold air. These devices blow jets of hot air from a hot air supply plenum against sections of the calender roll which are producing web that is too thick. Each hot air jet heats the section of roll against which it is directed, thereby causing the heated section to thermally expand. As the heated section expands, the nip between the heated roll section and the adjacent cooperating roll decreases, thus applying greater pressure to the web. The increased pressure, of course, decreases the thickness of the web pressed by the heated roll section. Alternatively, when these devices blow jets of cold air, from a separate cold air supply plenum, against the selected cylindrical sections of the calender roll, the cooled sections of the roll contract. This decreases the local roll diameter and therefore increases the thickness of the calendered web which is pressed by the cooled roll sections.

In these previously known devices, nozzles communicating with the interior of each hot and cold air plenum are used to direct jets of air against the calender roll. The nozzles are disposed along the hot and cold air supply plenums at intervals corresponding to the adjacent sections of the calender roll whose local diameters are to be controlled. Examples of such devices are shown in U.S. Pat. No. 2,981,175 to Goyette, U.S. Pat. No. 3,177,799 to Justice and U.S. Pat. No. 3,770,578 to Spurrell. These previously known devices use valves to control the flow of air through each nozzle. Since separate plenums provide the hot air and cold air, these devices require two valves and two nozzles to control the diameter of each section of the calender roll. Alternatively, a dual control mechanism may be used to mix the hot and cold air from the two plenums and then release the air through a single nozzle. In either configuration, this redundancy can increase the cost of these devices Another problem experienced with previously known calender roll controllers results from the fact that accurate control of the roll diameter requires precise metering of the air jets. Therefore, the valve control mechanisms generally should not exhibit hysteresis effects so that they can obtain repeatable settings regardless of whether the valve is being opened or closed. Furthermore, these control mechanisms usually must be capable of operating at both high and low temperatures. However, even when the valves work properly and the control mechanisms accurately control the size of the valve orifices, the rate at which air is released through the nozzles is often variable because the air pressure in each plenum depends upon both the number of valves open at one time and the volume of air released through each nozzle. Thus, the flow of air through the nozzles in these devices can be difficult to control.

Many of these previously known devices are subject to still other limitations and inefficiencies. For example, the nip control range is a function of the maximum and minimum temperatures of the air jets. However, the hot air in the hot air plenum is typically heated by waste steam from the power plant for the calender roll facility. Steam supplied by such a power plant usually has a maximum temperature of about 350° F., and inefficiencies in the heat exchange process further limit the maximum temperature of such steam heated air to about 325° F. Furthermore, to maintain the air temperature in the hot air plenum at 325° F., hot air must be continuously supplied to the hot air plenum, even when hot air is not being released through the nozzles. If hot air is not continuously supplied to the hot air plenum, the stagnant air in the plenum may cool to ambient temperature. Then, when a jet of hot air is required to increase the diameter of a section of the calender roll, the cooled stagnant air must first be purged from the plenum. This increases the response time of the device.

My previously filed copending applications, Ser. Nos. 694,855 and 695,438, are directed to calender roll controllers which eliminate many of the disadvantages of these previously known roll controllers. The devices described in these applications provide a constant flow of air from a single plenum through a plurality of nozzles. Each nozzle directs a jet of air from the plenum toward an opposing section of the roll whose diameter is to be controlled. However, instead of using valves to control the flow of air from hot and cold air plenums, as was done in previously known devices, the devices described in my previously filed applications use individually controllable electric air heaters to selectively control the temperature of the air jets. The heating and cooling of the calender roll sections by the temperature controlled air jets controls the diameter of the various roll sections by thermal expansion and contraction.

One particular form of my previous inventions comprises a single elongated plenum positioned lengthwise alongside a calender roll. A plurality of holes are formed at intervals in the wall of the plenum which faces the curved surface of the roll. Tubes are disposed inside the plenum so that the front end of each tube is aligned with one of the holes in the plenum wall. The plenum may be pressurized with ambient room temperature air so that the tubes inside the plenum direct jets of air from the plenum at opposing cylindrical sections of the rotating roll. Heating elements, such as coiled electrically resistive nichrome wire, are disposed inside each tube. Therefore, when a particular heating element within one of the tubes is energized, the air escaping through that particular tube is heated by contact with the energized heating element as the air flows along the length of the tube. Since the device does not have individual valves to control the flow of air through each tube, the rate with which air is emitted by each tube remains substantially constant. Only the temperature of the air jets change as more or less power is supplied to each of the heating elements within the tubes.

Since the calender roll controllers of my previously filed applications require only one plenum and can operate without any air flow control valves, these controllers have a relatively low initial cost. Additionally, because they use electric heating elements rather than steam heaters, the hotter air jet temperatures obtainable with these electric heaters can produce approximately two to five times the nip control range on a typical 12-14 inch diameter 190° F. calender roll.

SUMMARY OF THE INVENTION

As previously discussed, the air heaters of my previously filed applications can use electrical heating elements, such as coiled electrically resistive wire, to heat the jets of air directed at the calender roll. These heating elements will, of course, burn out from time to time and require replacement. The present invention is directed to a means for prolonging the life of these heating elements.

In the calender roll controllers of my previously filed applications, when a particular heating element is energized, air escaping from the plenum is heated by the heating element as the air flows along the length of the tube. Thus, the air in the tube is coldest near the rear of the tube and gets progressively hotter until it escapes at the front of the tube. Similarly, since the air absorbs the heat from the heating element, the element is also coldest near the rear of the tube and hottest at the front of the tube where the temperature difference between the heating element and air is the least. The hotter portion of the heating element near the front of the tube tends to burn out more quickly than the relatively cooler part of the heating element near the rear of the tube. Therefore, the heating element will usually fail near the front of the tube long before the cooler portion near the rear of the tube has reached the end of its useful life.

To increase the life expectancy of a heating element, the operating temperature of the front portion of the element must be decreased. To accomplish this, the device of the present invention has holes in the wal of each tube toward the front end of the heating element to admit a flow of cooling air. These holes allow air to flow directly from the plenum into the front portion of each tube. Since the air entering the tubes through these holes does not first flow along the entire length of the tubes, this air is cooler than the air which is heated by the heating element as it flows along the entire length of the tube. The flow of relatively cool air through the holes in the tube walls helps to cool the part of each heating element which is near the front of each tube. This prolongs the life expectancy of that portion of each heating element near the front of the tube where the tendency to burn out would otherwise be the greatest. Therefore, with the present invention, the life expectancy of an air heater is increased relative to the air heaters of my previous inventions.

BRIEF DESCRIPTION OF THE DRAWINGS

FIG. 1 is a perspective view of one embodiment of the present invention showing a plurality of nozzles disposed along the length of a plenum and directing jets of air against a calender roll.

FIG. 2 is a cross-sectional view of the embodiment illustrated in FIG. 1. This figure shows removable heating modules. Air holes formed in the wall of the inner tube of this heating module allow a flow of cooling air to enter the inner tube directly from the plenum to cool the heating coils near the front of the module.

FIG. 3 is a cross-sectional view of another embodiment of the present invention having a single row of nozzles directed against a calender roll and a curved shroud for preventing cold air entrainment. This embodiment is supported by an over-center support mechanism.

FIG. 4 is a detailed illustration of a heating module usable with the device of FIG. 3. Like the air heating module of FIG. 2, the heating module shown in this figure also has holes formed in the side walls of the module to admit a flow of cooling air into the tube.

FIG. 5a is a cross-sectional view of the heating module of FIG. 5 taken along the line 5a—5a.

Figure 5:
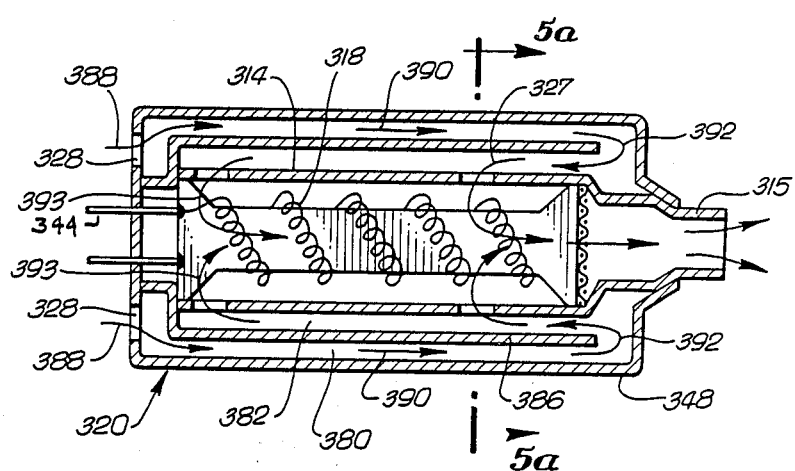
FIG. 5 is a detailed cross-sectional illustration of another heating module usable with the device of FIG. 3. This embodiment has multiple air channels for insulating the unheated air in the plenum from the heating elements inside the heating module. This emobidment also has air holes formed in the walls of the module's inner tube to admit a flow of air to cool the heating elements near the front of the module.

DETAILED DESCRIPTION OF THE PREFERRED EMBODIMENTS:

In one embodiment of the present invention, illustrated in FIG. 1, the calender roll control apparatus extends alongside a twelve inch diameter roll 10 of a calendering device. The apparatus comprises an air plenum 12 pressurized with room temperature air and a plurality of nozzles 14 dispersed along the length of the plenum 12 and communicating with its interior. A fan or blower 13 pressurizes the plenum 12 with the room temperature air to a pressure of about 1 psig. This pressurized air may be optionally preheated or cooled by any of a variety of well known devices 16 for heating or cooling air. The pressurized air in the plenum 12 escapes through the nozzles 14 which direct jets of the air against sections of the calender roll 10 to control its diameter. Additional nozzles 14 are disposed near the ends of the plenum 12 to compensate for the increased tendency of the calender roll 10 to cool at its ends.

FIG. 2 is a more detailed cross-sectional view of the device illustrated in FIG. 1. In this figure, a 1666 watt coiled nichrome wire heating element 18 is disposed inside the 0.625 inch inside diameter tube 23 of each air heating module 20. These modules 20 are detachable from the plenum 12 for convenient repair, inspection or replacement. In FIG. 2, the upper heating module 20 is shown detached from the plenum 12.

Air from the plenum 12 enters the heating module 20 of FIG. 2 through holes 22 in the module casing 24. The air then flows toward the rear of the heating module 20 through a channel 26 formed between the inner tube 23 of the module 20 and outer tubular casing 24. At the rear of the heating module 20 the air flow enters the interior of the inner tube 23. Arrows 28, 30 illustrate the flow path of the air. Air flowing through the inner tube 23 contacts the heating element 18. Therefore, although the air in the plenum 12 escapes at a constant rate through each nozzle 14, the temperature of the air escaping from each nozzle 14 can be elevated by selectively energizing one or more of the individually controllable heating elements 18.

When a heating element 18 is turned off, the unheated air escaping from the module 20 cools the roll. As shown in FIGS. 1-2, a single plenum 12 provides air to all the heating modules 20. It is, therefore, important that the heating elements 18 be insulated from the air in the plenum 12 so that the heating elements 18 will not heat the plenum air before the air enters the heating modules 20. The flow of air through the heating module channel 26 provides this insulating function. When a heating element 18 is energized, it heats the air flowing through the inner tube 23 of the heating module 20. Some of the heat from the heating element 18 will, of course, heat the inner tube 23 itself. The inner tube 23 will, in turn, heat the air flowing through the channel 26. However, the air flowing through the channel 26 forms a particularly effective barrier to the transfer of heat to the casing 24 of the heating module 20 because, as soon as the air in the channel 26 is heated, it is replaced by unheated air from the plenum 12. Thus, very little heat is transferred from the heating modules 20 to the air in the plenum 12.

In the embodiment of FIGS. 1-2, most of the air is channeled into the inner tube 23 at the rear of the tube 23. The air then flows toward the front nozzle end of the heating module 20. Thus, when the heating element 18 is energized, the air is coldest when it first enters the rear of the inner tube 23. The air temperature gradually increases as it absorbs heat from the heating element 18 so that the air is hottest just before it escapes through the nozzle 14. Thus, the relatively cold air at the rear of the inner tube 23 absorbs a substantial amount of heat from the rearmost portion of the heating element 18 and thereby cools this part of the heating element 18. However, when the air flow reaches the part of the heating element 18 near the front of the module 20, the air has already been substantially heated and, therefore, the part of the heating element 18 near the nozzle 14 is less effective at heating the air. Since the air absorbs less heat from this front part of the heating element 18, the front part of the element 18 remains hotter than the rearmost counterpart and hence tends to burn out more quickly.

The life expectancy of the heating elements can be increased by operating the heating elements 18 at a lower peak temperature. Therefore, to cool the front part of each heating element 18, the present invention provides holes 27 in the wall of the tube 23 near the nozzle 14 end of each module 20. These additional holes 27 are called "short circuit" air holes 27 because they allow a portion of the air which is being directed through the channel 26 to take a more direct or "short circuit" path into the inside of the tube 23. The size and placement of the short circuit air holes 27 are adjusted to equalize the temperature of the heating element 18 so that the temperature of the heating element 18 near the front of the tube 23 is approximately the same as the temperature of the heating element 18 at the rear end of the tube 23. In this way, neither end of the heating element 18 is more likely to burn out than the other end portion.

FIG. 3 illustrates a second embodiment of the present invention. This embodiment operates in a manner similar to the device of FIGS. 1-2. However, the device of FIG. 3 has a concave shroud 132 which acts to constrain the air emitted by the nozzles 114 of the air heating modules 120 so that the air remains in contact with the calender roll 110, thus enhancing the efficiently of heat transfer between the air and the roll 110. The shroud 132 also prevents the unheated ambient air outside of the device from being entrained by the air jets. This would reduce the effective temperature of the jets. Of course, a similar shroud 132 could be used with the embodiment of the invention illustrated in FIG. 1 and FIG. 2.

The cross-sectional view shown in FIG. 3 illustrates the nozzles 114 aligned lengthwise along the center of the plenum 112. The nozzles 114 may, of course, be positioned above or below the center line of the plenum 112. However, centrally positioned nozzles 114 generally enhance the efficiency of heat transfer between the jets of air and the calender roll 110 by providing an equally long flow path for air travelling between the calender roll 110 and the shroud 132, whether this air emerges at the top or bottom of the shroud 132. Additionally, like the device of FIG. 1, extra rows of nozzles 114 may be provided at the ends of the calender roll 110 above and/or below the center line of the plenum 112 to compensate for the increased tendency of the calender roll 110 to cool at its ends.

The calender roll control device of FIG. 3 is shown supported by an over-center support mechanism 134. This mechanism comprises two rigid pivotable arms 136. The arms 136 are disposed at either end of the plenum 112. These arms 136 support the plenum 112 so that the plenum 112 and shroud 132 are pivotable toward or away from the calender roll 110. An extendible air cylinder 138 is associated with each pivotable arm 136. Pressurizing the cylinders 138 with air causes them to expand, thus rocking the plenum 112 away from the calender roll 110. In the operating position, however, each air cylinder 138 is pressurized so that the nozzles 114 and shroud 132 are positioned approximately ½ inch to approximately 2 inches from the surface of the calender roll 110. The calender roll control device thus leans slightly toward the calender roll 110. In this metastable position, if the web 140 breaks and wraps around the roll 110, a slight forceful contact between the web 140 and the nozzles 114 or shroud 132 will be sufficient to rock the device back away from calender roll 110 and thus avoid damage to the device.

FIG. 4 is a detailed cross-sectional view of the heating module 120 illustrated in FIG. 3. This heating module 120 fits into the heating module socket 142 shown in FIG. 3. Two conducting pins 144 extend from the rear of the heating module 120 and plug into an electrical socket 146 positioned within the plenum 112. This module 120 may also be easily unplugged for convenient inspection, repair or replacement.

The heating module of FIG. 4 comprises an inner tube 114 which tapers to a nozzle 115 at the front end of the heating module 120. In operation, pressurized air from the plenum 112 enters the rear of the module 120 through hole 121 and escapes through the nozzle 115. As the air flows through the module 120, it is heated by the heating element 118. Like the heating elements 18 of the air heating module 20 shown in FIG. 2, this heating element 118 is formed from a coiled length of electrically resistive wire. The heating wire is suspended on a thin mica frame 152 which has a low thermal mass so that the temperature of the air jets can change rapidly in response to signals from a web thickness sensor 154 (FIG. 3). Furthermore, like the heating module 20 illustrated in FIG. 2, the heating module 120 of FIG. 4 also has a number of short circuit air holes 127 toward the front of the module 120. These air holes 127 allow the relatively cool air from the plenum 112 to impinge against and thereby cool the coils of heating wire 118 toward the front of the module 120 so that the temperature of the heating coils 118 near the front of the module 120 is approximately the same as the temperature of the heating coils near the rear of the module 120. Insulating material 150 between the inner tube 114 and the outer module casing 148 insulates the plenum air from the heating element 118 inside the module 120.

Figure 5A:
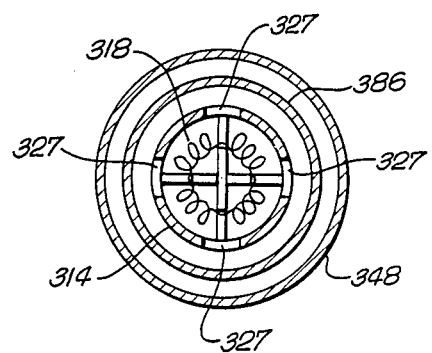

FIGS. 5 and 5a are detailed cross-sectional illustrations of another preferred embodiment of a heating module 320. This heating module 320 is also usable with the device of FIG. 3. It is similar in construction and operation to the heating module 120 of FIG. 4. However, it does not use insulating material 150. Instead, this embodiment uses two concentric annular air channels or conduit 380, 382 to insulate the relatively cool air in the plenum 112 from the heating element 318 and heated air inside the heating module 320. In operation, pressurized air from the plenum 112 enters holes 328 in the rear of the module 320. This air flows along the outer channel 380 toward the front of the heating module 320. The outer channel 380 is formed between the module casing 348 and an intermediate cylindrical member 386 positioned between the casing 348 and the inner tube 314. When this air flow reaches the front of the heating module 320, it changes direction and flows back toward the rear of the heating module 320 along the inner channel 382 formed between the intermediate cylindrical member 386 and the inner tube 314. Once the air flow reaches the rear of the heating module 320, it enters the inner tube 314 where it again changes direction and heads out of the module 320, past the heating element 318 and toward the calender roll 110 (FIG. 3). This serpentine channeling system, illustrated by arrows 388, 390, 392 and 393 in FIG. 5, generally provides better insulation between the relatively cold air in the plenum 312 and the heated air within the inner tube 314 of the module than the single layer of insulating material 150 shown in FIG. 4. Because two concentric channels are formed around the inner tube 314, this embodiment also provides better insulation than the single channel embodiment of FIG. 2.

The heating module of FIGS. 5 and 5a also provides short circuit air holes 327, similar to those of FIGS. 2 and 4, to cool the front portion of the heating element 318. In this embodiment, four 5/16 inch short circuit air holes 327 are formed, as shown in FIG. 5a, at 90° intervals around the circumference of the inner tube 314 approximately 1.75 inches or one-third of the length of the module 320 from its front end. The module 320 is approximately 5.25 inches long (excluding the pins 344) with an outside diameter of approximately 2.50 inches. The inside diameter of the main portion of the inner tube 314 is approximately 1.0 inch and the inside diameter of the nozzle end 315 of the inner tube 314 is approximately 0.56 inch. Ten cubic feet of air per minute flow through the nozzle 315. The heating element is a 1666 watt coiled nichrome wire heater.

Each embodiment of the present invention operates in substantially the same manner. Therefore, the operation of the device of the present invention will be described with reference to only the second embodiment illustrated in FIG. 3 and FIG. 4. However, the description which follows is also applicable to the other embodiments.

During operation of the invention, a sensor 154 measures the thickness of the web 140 at a plurality of locations across its width. This sensor 154 produces a signal corresponding to the measured thickness of the web 140 at each location. These signals are then fed to a power controlling device 172 which separately adjusts the power to each of the heating elements 118 to obtain a web 140 having uniform thickness. An example of a sensor controlled calender roll control device is shown in U.S. Pat. No. 4,114,528 to Walker. Depending upon the degree of deviation of the web 140 from the desired thickness, more or less power is applied to the heating elements 118 in the modules 120 adjacent to those sections of the calender roll 110 whose diameters are to be adjusted. The sections of the calender roll 110 producing too thick a web 140 are heated by energizing the heating elements 118 in an adjacent module 120. The greater the amount of power applied to the heating element 118, the hotter the air which impinges against the calender roll 110 and the more thermal expansion which occurs. For example, with 0.18 psig plenum pressure and a 0.625 inch nozzle diameter, a 1,666 watts heating element 118 will heat 65° F. air to 600° F. in about six seconds. Alternatively, when the sensing device 154 detects a thin web section 140, the power controlling device 172 directs less power to the heating element 118 in the adjacent heating module 120 or it turns the heating element 118 in the adjacent module 120 completely off. When the power to the heating element 118 is turned off, for example, the adjacent section of calender roll 110 is subjected to a flow of ambient temperature air. The ambient temperature air causes the adjacent sections of the calender roll 110 to contract, thereby increasing the local nip spacing and producing a thicker section of web 140.

As previously mentioned, many steam heated apparatuses for controlling the thickness of a calendered web are limited to heating air to a maximum temperature of about 325° F. In contrast, the electric air heaters of the present invention can achieve air temperatures of 600° F. or more. This higher temperature provides more than twice the nip control range on a typical 190° F., 12-inch diameter roll. Additionally, since the air flow through every nozzle 114 remains constant, more accurate control is possible. With the device of the present invention, only the temperature of the air jets escaping from each nozzle 114 changes and the temperature of each air jet is totally independent of the temperature of the air jets escaping from the other nozzles 114.

Three preferred embodiments of the present invention have been described. Nevertheless, it is understood that one may make various modifications without departing from the spirit and scope of the invention. For example, the number and placement of the short circuit air holes can be varied from the disclosed configuration. If so desired, one could arrange the placement, size and shape of the short circuit air holes so that the temperature of each electric heating element remained substantially constant along its entire length. In this case, of course, the size, shape and placement of the short circuit air holes would depend upon the volume of the air flow through the heating module and the power and configuration of the electric heating elements. Nevertheless, given the present disclosure, one of ordinary skill in the art could easily design a configuration of such short circuit air holes for any particular heating module so that the heating element in each tube had a substantially uniform temperature along its entire length. Thus, the invention is not limited to the preferred embodiments described herein.

I claim:

1. A fluid heating module for a calender roll controller or the like, comprising:

an elongated tube having a first hole at the front end of the tube and a second hole at the rear end of the tube to allow a primary flow of fluid through the tube from the rear to the front thereof, said tube having at least one additional opening in the wall of the tube to admit a secondary flow of fluid into the tube;

an electrically resistive fluid heating element having a front and a rear end, wherein the heating element is disposed inside the tube for heating said primary and secondary fluid flows, said heating element being disposed within the tube so that the front end of the heating element is closer to the front of the tube than the rear end of the heating element and the secondary fluid flow enters the tube through the additional opening adjacent to a portion of the front half of the heating element; and means for providing said secondary fluid flow for cooling at least part of the front half of the heating element.

2. A fluid heating module as in claim 1, wherein the tube has a plurality of additional openings in the tube wall, said openings being formed in and disposed circumferentially around the front half of the tube.

3. A fluid heating module as in claim 1, wherein the tube has a plurality of additional openings in the tube wall, said openings being formed in and disposed circumferentially around the tube one-third of the tube length from the front of the tube.

4. A fluid heating module as in claim 1, wherein said tube has plurality of additional openings in the tube wall of such size, shape and location to admit the secondary flow of fluid into the tube so that the secondary fluid flow maintains the heating element at a substantially constant temperature along the entire length of the heating element.

5. A calender roll control device for controlling the diameters of a plurality of axial sections of an axially elongated calender roll, the device comprising:

an elongated plenum having an elongated front wall, wherein a plurality of holes are formed in the front wall and spaced at intervals lengthwise along the wall;

means for pressurizing the plenum with air;

a plurality of elongated tubes having holes at the front and rear ends thereof, each tube being in flow communication with the interior of the plenum through one of the holes in the plenum wall so that the tubes direct a primary flow of the pressurized air out of the plenum through each of the holes in the plenum wall, said primary flows of air flowing through each tube from the rear to the front of the tube, and wherein each of said tubes has at least one additional opening in the tube wall to admit a secondary flow of air into the tubes; and an electrically resistive air heating element inside each tube for heating the primary and secondary air flows, said heating elements extending along the length of each tube and being disposed within said tubes so that said secondary air flow enters each tube through the additional opening adjacent to a portion of the front half of each heating element, said secondary air flow cooling at least part of the front half of each heating element.

6. A calender roll control device as in claim 5, wherein each of said tubes has a plurality of additional openings in the tube walls to admit the secondary flow of air into the tube, said additional openings being disposed circumferentially around the front half of each of the tubes.

7. A calender roll control device as in claim 5, wherein each tube has a plurality of additional openings in the tube wall to admit the secondary flow of air into the tube, said additional openings being disposed circumferentially around the tube approximately one-third of the tube length from the front of said tube.

8. A calender roll control device as in claim 5, wherein each of the tubes has a plurality of additional openings formed in the tube wall to admit the secondary flow of air into each of the tubes, said additional openings being of such size, shape and location so that the secondary air flow through the additional openings maintains each heating element at a substantially constant temperature along the entire length of the heating element.

9. A calender roll control device as in claims 5, 6, 7 or 8, further comprising a cylindrical calender roll disposed lengthwise along the front wall of said plenum so that the flow of air escaping from the tubes impinges upon the cylindrical surface of said roll.

10. A fluid heating module for a calender roll controller or the like, comprising:

an elongated tube having a first hole at the front end of the tube and a second hole at the rear end of the tube to allow a flow of fluid through the tube from the rear to the front thereof;

a fluid heating element inside the tube for heating said fluid flow, said heating element including electrically resistive material extending along the length of the tube; and means for maintaining the electrically resistive material at a substantially constant temperature along the direction of fluid flow.

11. A calender roll control device for controlling the diameters of a plurality of axial sections of an axially elongated calender roll, the device comprising:

an elongated plenum having an elongated front wall, wherein a plurality of holes are formed in the front wall and spaced at intervals lengthwise along the wall;

means for pressurizing the plenum with fluid;

a plurality of elongated tubes having holes at both ends thereof to allow a flow of fluid through each tube, each tube being in flow communication with the interior of the plenum throgh one of the holes in the plenum wall so that the tubes direct flows of pressurized fluid out of the plenum through each of the holes in the plenum walls;

a fluid heating element inside each of the tubes for heating the fluid flowing through the tubes, each of said heating elements including electrically resistive material extending along the length of each tube; and means for maintaing the electrically resistive material at a substantially constant temperature along the direction of fluid flow.

12. A fluid heating module for a calender roll controller or the like, as in claim 10, wherein the elongated tube has at least one opening in the tube wall in the front half thereof, and wherein the front end of of the heating element is downstream in the fluid flow relative to the rear end of the heating element, and the means for maintaining the electrically resistive material at a substantially constant temperature includes means for direction a flow of cooling fluid at at least a portion of the front half of the heating element.

13. A calender roll control device as in claim 11, wherein the elongated tube has at least one opening in the tube wall in the front half thereof, and wherein the front end of the heating element is downstream in the fluid flow relative to the rear end of the heating element and the means for maintaining the electrically resistive material at a substantially constant temperature includes means for directing a flow of cooling fluid at at least a portion of the front half of the heating element.

14. A fluid heating module as in claims 1, 2, 3, 4, 10 or 12, wherein the fluid is air.

15. A calender roll control device as in claims 11 or 13, wherein the fluid is air.

16. A fluid heating module, comprising:

a tube having a first hole at the front end of the tube and a second hole at the rear end of the tube;

primary fluid flow means for causing a primary flow of fluid through the tube from the rear to front of the tube;

an electrically resistive fluid heating element having a first and a second end, said heating element being disposed inside the tube for heating said primary fluid flow such that the second end of the heating element is upstream in the primary fluid flow relative to the first end of the heating element; and cooling means for directing a cooling secondary fluid flow at a portion of the heating element such that the secondary fluid flow cools said portion of the heating element, said portion being closer to the first end than the second end of said heating element.

17. A calender roll control device for controlling the diameters of a plurality of axial sections of an axially elongated calender roll, the device comprising:

an elongated plenum having an elongated front wall, wherein a plurality of holes are formed in the front wall and spaced at intervals lengthwise along the wall;

means for pressurizing the plenum with air;

a plurality of elongated tubes having holes at both ends thereof to allow a primary flow of air through each tube, each tube being in flow communication with the interior of the plenum through one of the holes in the plenum wall so that the tubes direct said primary flows of pressurized air out of the plenum through each of the holes in the plenum wall;

electrically resistive air heating elements having first and second ends, each of said heating elements being disposed inside one of the tubes for heating the primary air flows, wherein the second end of each heating element is upstream in the primary air flows relative to the first end of each of said heating elements; and cooling means for directing a cooling secondary air flow at a portion of each heating element such that the secondary air flows cool said portions of the heating elements, said portions of the heating elements being closer to the first end than the second end of each heating element.

* * * * *